United States Patent
Sibre

(10) Patent No.: US 7,213,891 B2
(45) Date of Patent: May 8, 2007

(54) DEVICE PROVIDING PROTECTION AGAINST UNTIMELY BRAKING

(75) Inventor: Jérôme Sibre, Paris (FR)

(73) Assignee: Messier Bugatti, Velizy Villacoublay (FR)

( * ) Notice: Subject to any disclaimer, the term of this patent is extended or adjusted under 35 U.S.C. 154(b) by 0 days.

(21) Appl. No.: 10/891,022

(22) Filed: Jul. 15, 2004

(65) Prior Publication Data
US 2005/0012385 A1    Jan. 20, 2005

(30) Foreign Application Priority Data
Jul. 16, 2003 (FR) .................. 03 08650

(51) Int. Cl.
*B60T 13/00* (2006.01)
(52) U.S. Cl. ........................ 303/20; 303/199
(58) Field of Classification Search .......... 303/20, 303/122, 122.04, 122.08, 126, 199; 188/72.7, 188/72.8, 265, 156; 244/111
See application file for complete search history.

(56) References Cited

U.S. PATENT DOCUMENTS

| | | | |
|---|---|---|---|
| 5,125,483 A * | 6/1992 | Kitagawa et al. ............. | 303/20 |
| 5,921,641 A * | 7/1999 | Lupges et al. ............... | 303/191 |
| 6,183,051 B1 * | 2/2001 | Hill et al. ..................... | 303/20 |
| 6,513,885 B1 | 2/2003 | Mackness et al. | |
| 6,527,348 B2 * | 3/2003 | Jensen ........................ | 303/20 |
| 2006/0152073 A1 * | 7/2006 | Sibre .......................... | 303/20 |

FOREIGN PATENT DOCUMENTS

| | | | |
|---|---|---|---|
| FR | 2 790 730 A1 | | 9/2000 |
| GB | 2332931 A | * | 7/1999 |

* cited by examiner

*Primary Examiner*—Thomas Williams
(74) *Attorney, Agent, or Firm*—Sughrue Mion, PLLC

(57) ABSTRACT

The invention relates to a device for providing protection against untimely braking, the device being specially adapted to an electromechanical brake including at least one actuator having a pusher suitable for being displaced by means of an electric motor controlled by a control module so as to press in controlled manner against a stack of disks, in which the device comprises a safety member suitable for being placed in a first state in which it prevents the pusher from being displaced by the electric motor, and a second state in which it leaves the pusher free to be displaced by the electric motor, the safety member being controlled by a control logic circuit which by default places the safety member in the first state and places the safety member in the second state only in response to the simultaneous presence of an order coming from the control module and a confirmation signal that does not come from the control module and that is independent thereof.

6 Claims, 3 Drawing Sheets

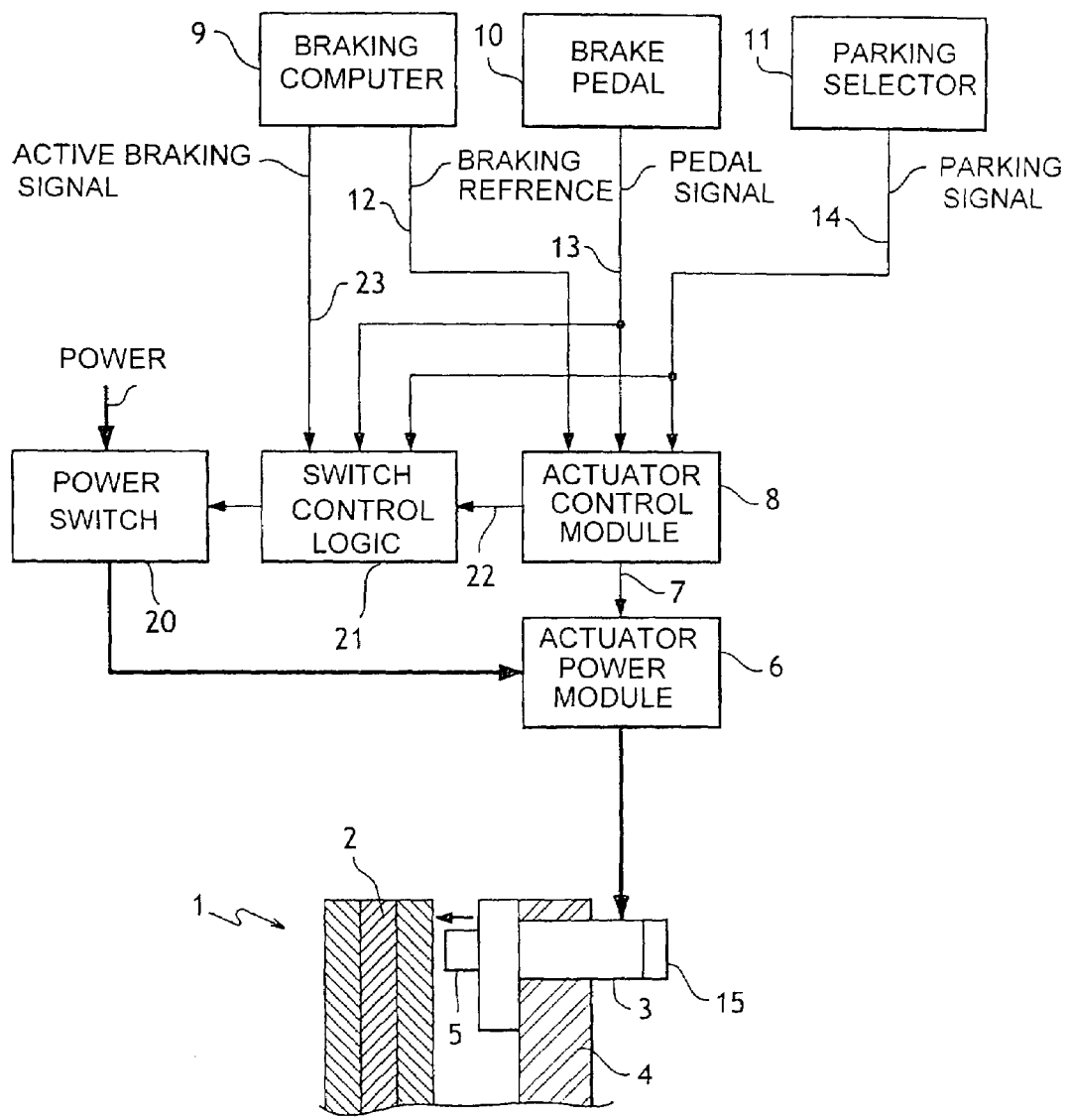

DEVICE PROVIDING PROTECTION AGAINST UNTIMELY BRAKING

The invention relates to a device providing protection against untimely braking, the device being particularly adapted to electromechanical braking.

BACKGROUND OF THE INVENTION

In the field of hydraulic brakes, mention can be made of document FR-A-2 790 730 which describes a device for providing protection against untimely braking, the device including a safety system with a software path that is configured to activate a general valve, and with a hardware path that is configured to inhibit the general valve. The technological background of the invention is also illustrated by document U.S. Pat. No. 6,513,885 which teaches a redundant arrangement for a braking circuit.

Brakes of the electromechanical type comprise a stack of disks together with one or more electromechanical actuators disposed facing the stack of disks, said actuators including a pusher for pressing against the stack of disks. The pusher is actuated by an electric motor controlled by a control module of the actuator, which module, in response to a braking reference signal generated by a braking computer, delivers an order for modulating power to a power module, which in turn delivers the required power to the motor of the actuator.

In the event of the braking computer or the actuator control module failing, it can happen that the pusher is constrained to press against the disks in untimely manner, which can be dangerous for the safety of the vehicle.

OBJECT OF THE INVENTION

An object of the invention is to propose an improved method of providing protection against untimely operation of the pusher of an electromechanical brake.

BRIEF SUMMARY OF THE INVENTION

The invention provides a device for providing protection against untimely braking, the device being specially adapted to an electromechanical brake including at least one actuator having a pusher suitable for being displaced by means of an electric motor controlled by a control module so as to press in controlled manner against a stack of disks, in which the device comprises a safety member suitable for being placed in a first state in which it prevents the pusher from being displaced by the electric motor, and a second state in which it leaves the pusher free to be displaced by the electric motor, the safety member being controlled by a control logic circuit which by default places the safety member in the first state and places the safety member in the second state only in response to the simultaneous presence of an order coming from the control module and a confirmation signal that does not come from the control module and that is independent thereof.

Thus, a breakdown affecting the actuator control module or the power stage controlled by the control module cannot cause the pusher to move. This avoids any risk of untimely braking. The device of the invention thus greatly increases the safety of the vehicle braking system.

Preferably, in a normal braking situation, the confirmation signal is an active braking signal coming from a braking computer, which also serves to deliver a braking reference signal to the actuator control module.

More preferably, in an emergency braking situation where the braking computer is faulty, the confirmation signal is a pedal signal coming from a brake pedal actuated by the pilot.

In a first embodiment of the invention, the safety member is a member for blocking the pusher mounted on the actuator, and also serving to block the actuator in a parking brake position.

Advantage is thus taken of the presence of the blocking member which was originally provided for a completely different function (preventing the aircraft from moving while parked and while the actuators are no longer powered), causing said member to perform a novel function of blocking the pusher, thus making it possible to provide protection against untimely braking.

Preferably, the blocking member is a power-failure brake, otherwise used for maintaining a force on the parking brake.

In a second embodiment of the invention, the safety member is a power switch placed in a power supply line of the actuator.

Interrupting the power supply of the motor prevents any displacement of the pusher regardless of the displacement orders delivered by the control module.

BRIEF DESCRIPTION OF THE DRAWINGS

The invention will be better understood in the light of the following description made with reference to the figures of the accompanying drawings, in which:

FIG. 3 is a block diagram of an aircraft braking circuit fitted with a device for providing protection against untimely braking in accordance with a second embodiment of the invention, making use of a power switch.

DETAILED DESCRIPTION OF THE INVENTION

Figure 1:
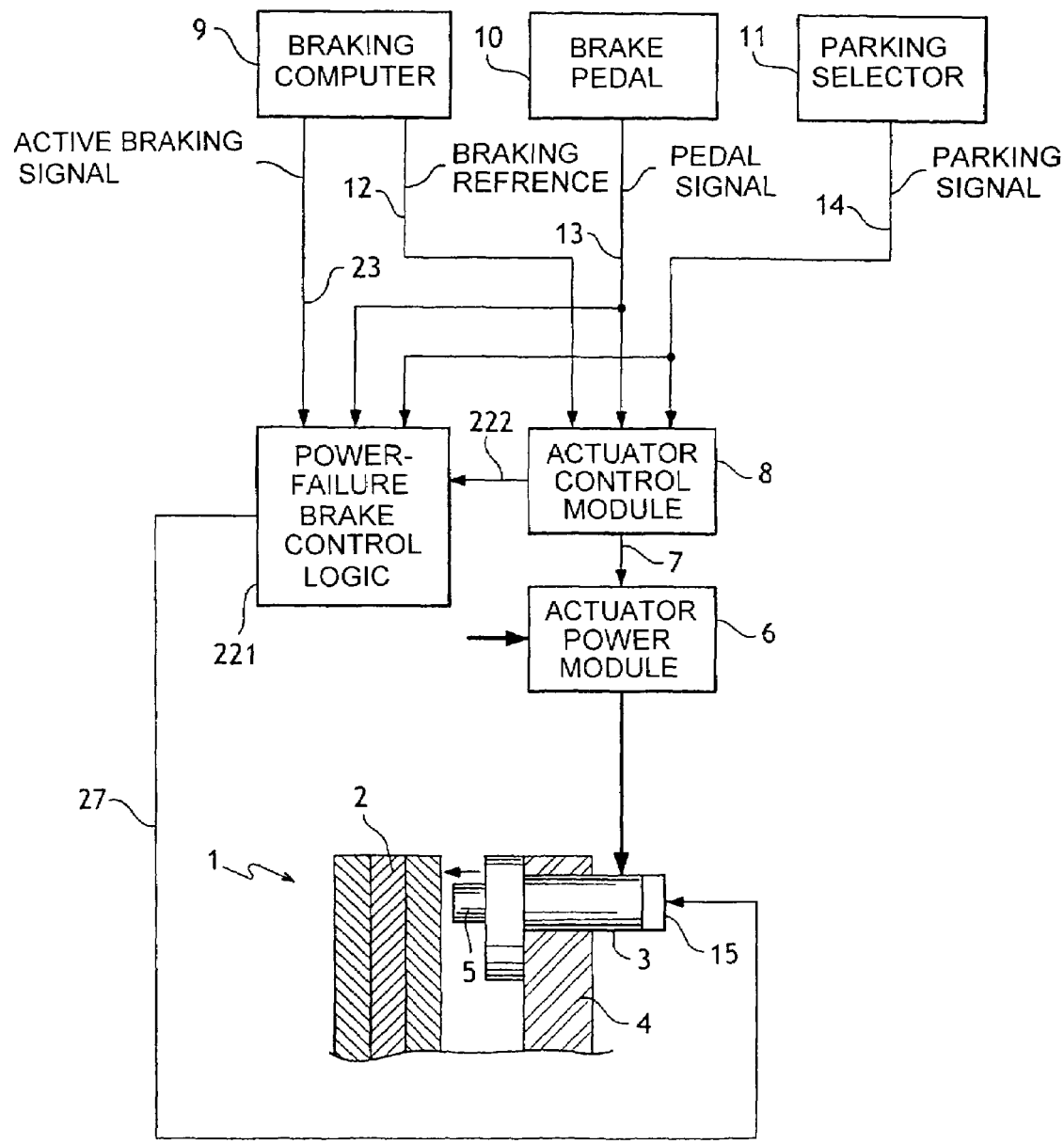
FIG. 1 is a block diagram of an aircraft braking circuit fitted with a device for providing protection against untimely braking in accordance with a first embodiment of the invention, making use of a power-failure brake.

With reference to FIG. 1, and in known manner, an electromechanical aircraft brake 1 comprises a stack of disks 2 made up of disks that are constrained to rotate with the wheel for braking alternating with disks that are prevented from rotating.

The brake 1 comprises a plurality of actuators 3 (only one is shown here) which are carried by a ring 4 so as to face the stack of disks 2. Each actuator 3 includes a pusher 5 suitable for being moved towards the stack of disks 2 in order to press against it, and thus generate a braking force.

The pusher 5 is moved by an electric motor via a transmission that transforms a rotary movement of the electric motor into a movement in translation of the pusher 5.

The electric motor is powered via an actuator power module 6 which delivers electrical power to the motor as a function of an order 7 delivered by an actuator control module 8.

The orders delivered by the actuator control module 8 are generated from various signals, coming in particular from a braking computer 9, a brake pedal 10, and a parking brake selector 11.

The aircraft braking system as a whole is designed in this case to be capable of operating in three modes: a normal mode; an emergency mode; and a parking mode.

In normal mode, the actuator control module 8 generates an order 7 as a function of a braking reference signal 11 received from the braking computer 9.

In emergency mode, in which the braking computer has failed, the actuator control module 8 generates a order 7 as a function of a pedal signal 13 representative of the extent to which the brake pedal 10 has been pressed down directly by the pilot.

In parking mode, which has priority over the other modes, the actuator control module 8 generates a parking brake order 7 in response to a parking signal 14 issued when the pilot actuates the parking selector 11. To enable parking braking to be maintained even when the airplane is not in operation, the actuator 3 is fitted with a power-failure brake 15 which, when unpowered, blocks the pusher 5 in position, by blocking one of the transmission shafts in the transmission between the electric motor and the pusher 5.

It then suffices to make sure that the power-failure brake 15 is powered, to cause the pusher 5 to be moved so as to exert a parking force on the stack of disks, and then to disconnect the power supply to the power-failure brake 15 so as to block the actuator in the parking brake position.

The use of a power-failure brake as a blocking member is particularly appropriate since it enables parking brake force to be maintained without consuming any electrical power.

In a first embodiment of the invention as shown in FIG. 1, the equipment providing safety against untimely braking is constituted by the power-failure brake 15 itself.

Use is thus made of a member that is already in existence, so as to cause it to perform a new function, i.e. that of providing protection against untimely actuation.

The power-failure brake is controlled by control logic 221 which, by default, interrupts the power supply to the power-failure brake 15, thereby blocking the pusher 5.

The control logic 221 is arranged to power the power-failure brake 15 (and thus unblock the pusher 5) only in response to an unblocking order 222 coming from the actuator control module 8 and confirmed by a confirmation signal that does not come from the actuator control module 8, and that is independent thereof.

Figure 2:
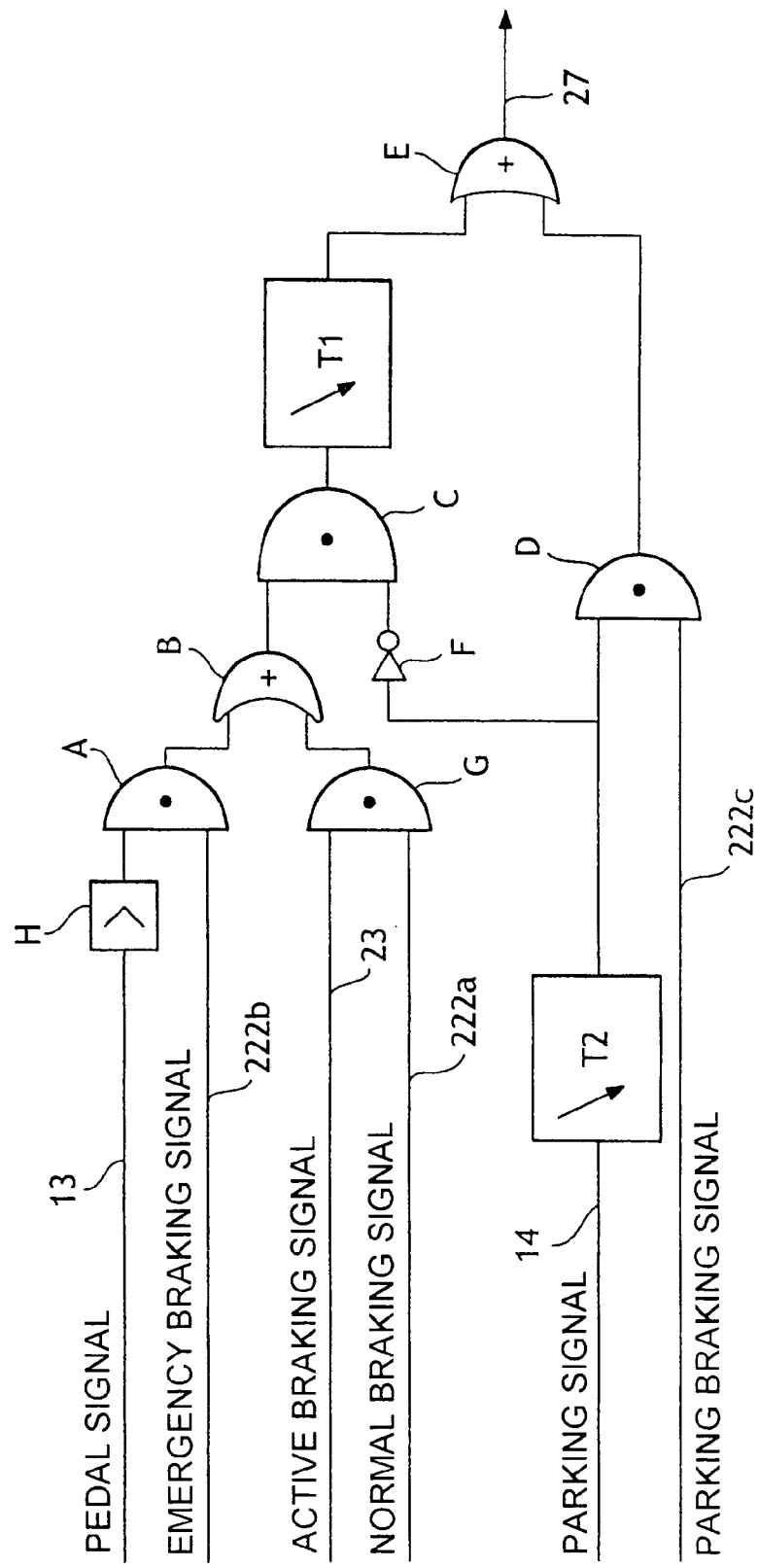
FIG. 2 is a diagram of a logic circuit for controlling the power-failure brake of this first embodiment of the invention as shown in FIG. 1.

With reference to FIG. 2, the logic circuit 221 for controlling the power-failure brake 15 generates a control signal 27 for the power-failure brake 15 from the following signals:

unblocking orders 222 coming from the actuator control module 8 and constituted, depending on the mode of operation in which the aircraft braking system is to be found, by a normal braking signal 222a, an emergency braking signal 222b, or a parking brake signal 222c;

the active braking signal 23 generated by the braking computer 9;

the pedal signal 13 coming from a potentiometer fitted to the brake pedal 10 situated in the cockpit and actuated by the pilot; and the parking signal 14 coming from the parking selector 11 situated in the cockpit and actuated by the pilot.

By means of these signals, the logic circuit 221 for controlling the power-failure brake 15 serves to control said brake, both to provide the parking brake function and for acting in accordance with the invention to lock the actuator when it is inactive, so as to avoid any untimely braking.

The logic circuit 221 for controlling the power-failure brake 15 is described in detail below.

Firstly concerning the parking brake, the assembly operates as follows. When the pilot engages the parking selector 11, a parking signal 14 is generated. Once this signal has been generated, the actuator control module 8 generates a parking brake signal 222c. The parking signal 14 and the parking brake signal 222c are processed by the AND gate referenced D to generate a control signal 7 (via the OR gate referenced E). While powered in this way, the power-failure brake unlocks the actuator.

The actuator control module 8 then generates an order 7 for application to the actuator power module 6 so as to cause the pusher 5 to be moved to press against the stack of disks 2 with a determined parking brake force. Once this parking brake force has been applied, the actuator control module 8 inverts the parking brake signal 222c, thereby interrupting the power supply to the power-failure brake 15. Deprived of its power supply in this way, the power-failure brake 15 locks the actuator. The actuator control module 8 then interrupts the order 7 that was being applied to the actuator power module 6.

The parking brake force is thus maintained without consuming any electricity in the actuator 3 or in the power-failure brake 15.

As soon as the parking brake selector 11 is disengaged by the pilot, the actuator control module 8 generates an order 7 for application to the actuator power module 6, so as to cause the pusher 5 to exert a force on the stack of disks 2 that is equivalent to the parking brake force, and then the actuator control module 8 generates a parking brake signal 222c.

A time delay T2 that is active only when the parking brake selector 11 goes from the engaged state to the disengaged state, delays the change of state in the parking signal 14.

Thus, said signal continues to remain at its previous value so that the parking brake signal 222c as generated by the actuator control module 8 suffices via the gates D and E to generate a control signal 27 that enables the power-failure brake 15 to be powered. When powered in this way, the power-failure brake 15 unlocks the actuator.

Thereafter, the actuator control module 8 generates an order 7 for the actuator power module 6 so as to cause the pusher 5 to move away from the stack of disks 2. Once the pusher has moved away, the actuator control module 8 inverts the parking brake signal 222c, thereby having the effect of interrupting the power supply to the power-failure brake 15. When no longer powered in this way, the power-failure brake 15 locks the actuator.

The time delay T2 is used to leave the actuator control module 8 sufficient time to withdraw the pusher 5. If the signal processed by the gate D were to pass immediately to a value representative of the actuator being disengaged, then the output from the gate D would immediately become zero and would cause the actuator to be locked immediately. The actuator control module 8 would then not have enough time to withdraw the pusher 5.

Instead of using a timeout, it would also be possible to envisage making inversion of the parking brake signal 222c conditional on a signal being delivered to indicate that the pusher has been withdrawn, said signal coming from the actuator control module 8. However, in order to separate management of the actuator 3 completely from management of the power-failure brake 15, it is preferable in this case to use a timeout.

In accordance with the invention, the power-failure brake 15 is used not only for parking braking, but also to protect the aircraft against untimely braking while the braking system is in normal braking mode or in emergency braking mode.

While operating in normal braking mode, the actuator control module 8 generates a normal braking signal 222a.

When the braking computer 9 delivers a braking reference signal 12 to the actuator control module 8, it generates simultaneously an active braking signal 23.

The normal braking signal 222a and the active braking signal 23 are processed by an AND gate referenced G, whose output is processed by the OR gate referenced B, and by the AND gate referenced C, and finally by the OR gate referenced E in order to generate a command 27 for powering the power-failure brake 15.

The output from the gate B is processed in the gate C with a signal coming from the NOT gate referenced F which has the function of inverting the parking signal 4, so that the output from the gate C is positive only if the parking signal 14 is in a state indicating that the parking brake selector 11 is not engaged.

This disposition makes it possible to give the parking signal 14 priority over the other signals. Thus, engaging the parking brake selector 11 inhibits any procedure other than that which leads to applying the parking brake force as described above.

It is therefore assumed below that the parking signal 14 is zero, thus indicating that the parking brake selector 11 is not engaged.

Under such circumstances, the presence of the active braking signal 14 makes it possible to generate a control signal 27 for powering the power-failure brake 15. While powered in this way, the power-failure brake 15 unlocks the actuator, thereby enabling the actuator control module 8 to control braking as a function of the braking reference signal 12 delivered by the braking computer 9.

Once the braking action has been performed, the braking computer 9 cancels the active braking signal 23. The same gates G, B, C, E invert the control signal 27, thereby interrupting the supply of power to the power-failure brake 15. When unpowered in this way, the power-failure brake 15 locks the actuator. This locking prevents any displacement of the pusher 5, and thus any untimely braking.

A time delay T1 leaves enough time for the actuator control module 8 to withdraw the pusher 5 before locking of the actuator takes place.

Once again, a time delay is preferred over using a combination with a signal that is indicative of the position of the pusher or that the actuator has operated, for reasons of segregating management of the actuator from management of the power-failure brake.

Finally, in emergency mode operation, when the braking computer 9 has failed, the actuator control module 8 generates an emergency braking signal 222b which is processed by an AND gate referenced A situated upstream from the gate B. This signal enables a control signal 27 to be generated for applying power to the power-failure brake 15 when a pedal signal 13 is generated by the pilot acting of the brake pedal 10. In order to avoid the power-failure brake 15 being unlocked pointlessly, a comparator referenced H enables the brake signal 13 to be taken into account only when it exceeds a predetermined threshold.

Once braking has been performed, i.e. when the pedal signal 13 drops back below the threshold of the comparator H, the control signal 27 is cancelled, thereby interrupting the power supply to the power-failure brake 15. When unpowered in this way, the power-failure brake 15 locks the actuator. The time delay T1 allows the actuator control module 8 sufficient time to withdraw the pusher 5.

This locking prevents any displacement of the pusher 5 and thus any untimely braking due to malfunction of the braking computer or of the control module.

In a second embodiment of the invention, as shown in FIG. 3, the braking system is fitted with safety equipment consisting in a power switch 20 controlled by a switch control logic circuit 21.

The switch control locking circuit 21 places the switch 20 by default in an open state in which the actuator power module 6 is not powered. In this state, the pusher 5 of the actuator 3 cannot move in response to an order from the actuator control module 8.

The switch control logic circuit 21 is arranged to place the switch 20 in a closed state solely in response to a closure order 22 coming from the actuator control module 8, as confirmed by a confirmation signal that does not come from the actuator control module 8 and that is independent therefrom.

Depending on the mode of operation of the aircraft braking system, the above-mentioned confirmation signal may be issued by different members.

In normal mode, the confirmation signal is an active braking signal 23 issued by the braking computer 9, which indicates that the braking computer is currently issuing a braking reference signal which requires the pusher 5 to be moved. This active braking signal may be constituted merely by the braking reference signal 12 itself, or it may be generated from said braking reference signal. Thus, during all stages in which the braking reference signal 23 is zero, the power switch 20 is in an open state so the actuator 3 is not powered, thus avoiding any untimely displacement of the pusher 5.

In emergency mode, the confirmation signal is the pedal signal 13. Similarly, during all stages in which the brake pedal is not actuated, the power switch 20 is in an open state and the actuator 3 is not powered, thus avoiding any untimely displacement of the pusher 5.

The power switch 20 is in this case placed upstream from the actuator power module 6, however it could equally well be placed downstream therefrom.

The invention is not limited to the particular embodiments of the invention described above, but on the contrary it covers any variant coming within the ambit of the invention as defined by the claims.

In particular, although protection against untimely braking is provided in the two embodiments described by means of a single safety member, in order to further increase the safety of the aircraft it would be possible to provide two safety members operating in parallel, for example by fitting the braking device shown in FIG. 1 with the power switch shown in FIG. 3.

What is claimed is:

1. A device for providing protection against untimely braking of an electromechanical brake, which includes at least one actuator having a pusher suitable for being displaced by means of an electric motor controlled by a control module so as to press in a controlled manner against a stack of disks, the device comprising:

a safety member operative in a first state to prevent the pusher from being displaced by the electric motor, and operative in a second state to leave the pusher free to be displaced by the electric motor, control logic element operative to control the safety member and by default places the safety member in the first slate and places the safety member in the second state only in response to the simultaneous presence Qf a command from the control module and a confirmation signal that does not come from the control module and that is independent thereof.

2. A device according to claim 1, wherein, in a normal braking situation, the confirmation signal is an active braking signal coming from a braking computer, which also serves to deliver a braking reference signal to the actuator control module.

3. A device according to claim 2, wherein, in an emergency braking situation where the braking computer is faulty, the confirmation signal is a pedal signal coming from a brake pedal.

4. A device according to claim 1, wherein the safety member is a member for blocking the pusher mounted on the actuator, and also serving to block the actuator in a parking brake position.

5. A device according to claim 4, wherein the blocking member is a power-failure brake.

6. A device according to claim 1, wherein the safety member is a power switch placed in a power supply line of the actuator.

* * * * *